(12) United States Patent
Santos-Gomez

(10) Patent No.: US 7,386,847 B2
(45) Date of Patent: Jun. 10, 2008

(54) TASK ROSTER

(75) Inventor: Lucinio Santos-Gomez, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 09/968,585

(22) Filed: Oct. 1, 2001

(65) Prior Publication Data

US 2003/0065705 A1    Apr. 3, 2003

(51) Int. Cl.
*G06F 9/46* (2006.01)
(52) U.S. Cl. .................... 718/100; 718/106; 717/101
(58) Field of Classification Search ............... 718/104, 718/107, 106, 100; 709/107; 715/705; 345/140; 717/101

See application file for complete search history.

(56) References Cited

U.S. PATENT DOCUMENTS

| | | | | |
|---|---|---|---|---|
| 3,745,671 A | * | 7/1973 | Mortimer | 434/30 |
| 5,388,268 A | * | 2/1995 | Beach et al. | 717/127 |
| 5,841,959 A | * | 11/1998 | Guiremand | 345/440 |
| 6,044,394 A | * | 3/2000 | Cadden et al. | 718/107 |
| 6,330,594 B1 | * | 12/2001 | Swart | 709/219 |
| 6,833,847 B1 | * | 12/2004 | Boegner et al. | 715/705 |
| 6,928,625 B2 | * | 8/2005 | Makinen | 715/822 |

\* cited by examiner

*Primary Examiner*—Meng-Ai An
*Assistant Examiner*—Camquy Truong
(74) *Attorney, Agent, or Firm*—Jeanine Ray-Yarletts, Esq.; Steven M. Greenberg, Esq.; Carey Rodriguez Greenberg & Paul LLP

(57) ABSTRACT

A task roster. A task roster can include a visual list of component tasks, the component tasks collectively forming a high-level task; a specified sequence in which the component tasks are to be performed; and, one or more visual status indicators, each visual status indicator having a corresponding component task, each visual status indicator further indicating whether the corresponding component task has been performed in the specified sequence. The task roster also can include a component task initiator configured to launch a selected component task in the visual list of component tasks upon a user-selection of the selected component task.

6 Claims, 2 Drawing Sheets

TASK ROSTER

BACKGROUND OF THE INVENTION

1. Statement of the Technical Field

The present invention relates to user interface technology and more particularly to a flexible user interface for facilitating the performance of tasks in a prescribed order.

2. Description of the Related Art

In complex software products, for instance applications development tools, often users perform important tasks such as creating, mapping and deploying software objects. In many cases, these task ought to be performed in a prescribed order. In particular, these task typically are performed sequentially in order to achieve a higher-order task such as the deployment of a software components.

Conventional software products in which such higher-order tasks can be performed provide for the sequential completion of tasks using the user interface mechanism often referred to as a "task wizard". Traditional task wizards guide users through a pre-defined sequence of tasks. Still, those tasks often must be performed in the task wizard as a unit.

Specifically, when using a task wizard, individual tasks cannot be performed out of order. Furthermore tasks cannot be performed while performing other tasks or processes. In sum, when using a task wizard, a user either performs the prescribed tasks contiguously, or not at all. It is not possible to perform intermediate tasks related to routine tasks performed in arbitrary order. In the context of a software development application, when using a task wizard, coding, editing and debugging cannot be performed out of order.

Still, in many cases, it is neither necessary nor convenient to perform tasks in a contiguous manner. In that regard, in some software applications, it is preferable that tasks can be selected non-sequentially and non-contiguously through a common UI mechanism such as a drop-down menu of task. Notwithstanding, when tasks can be selected from a drop-down menu, the drop-down menu often can include tasks which are not directly related to those tasks which must be performed in sequence. Examples of unrelated tasks can include window control, navigation and clipboard operations.

Despite the myriad of tasks which can be presented in a drop-down menu, however, such drop-down menus neither indicate nor enforce the sequence in which certain tasks must be performed. Notwithstanding, there are high-level tasks in which it is crucial that its component tasks are performed in a prescribed sequence. In these high-level tasks, however, it is not always necessary to perform the component tasks contiguously. Rather, in these high-level tasks it is acceptable to perform the component tasks sequentially, but not necessarily contiguously.

SUMMARY OF THE INVENTION

The present invention is a task roster. A task roster is an enhanced user interface (UI) mechanism for presenting, highlighting and initiating high-level tasks in a software application. Specifically, the task roster can facilitate the completion of component tasks in a prescribed order without requiring those component tasks to be completed contiguously. Moreover, to assist users in completing the component tasks in the prescribed order, the task roster can provide status information regarding the completion status of the component tasks.

In one aspect of the present invention, a task roster can include a visual list of component tasks, the component tasks collectively forming a high-level task; a specified sequence in which the component tasks are to be performed; and, one or more visual status indicators, each visual status indicator having a corresponding component task, each visual status indicator further indicating whether the corresponding component task has been performed in the specified sequence. The task roster also can include a component task initiator configured to launch a selected component task in the visual list of component tasks upon a user-selection of the selected component task.

A method for achieving a high-level task can include the steps of: listing component tasks in a user interface (UI) control, the component tasks collectively forming the high-level task; retrieving a specified sequence in which the component tasks are to be performed in order to achieve the high-level task; initiating selected component tasks in the list in the UI control, regardless of the specified sequence; and, visually indicating whether each of the component tasks in the list have been performed in the specified sequence. The method further can include providing a list of high-level tasks, each high-level task including one or more component tasks; and, performing the listing, retrieving, initiating, and visually indicating steps for selected ones of the high-level tasks.

Notably, the high-level tasks can be software development tasks to be performed in a software development application. Still, the invention is not limited in this regard and the high-level tasks can include other complex tasks. Examples of alternative high-level tasks can include, for example those tasks commonly encountered in computer aided design applications, medical procedure tracking applications and the like.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a task roster. A task roster is an enhanced user interface (UI) mechanism which can be used to present and initiate component tasks which collectively result in the completion of a high-level task. For example, in the context of a software development application such as an integrated development environment, a high-level task can include the creation and deployment of a computer program. The component tasks associated with the creation and deployment of a computer program can include the creation, editing, compilation, linking and deploying of the computer program.

As one skilled in the art will recognize, the linking and compilation tasks cannot be performed out of order. That is, to achieve the high-level task of creating and deploying a computer program, each of the aforementioned component tasks must be performed sequentially. While a conventional task wizard can require that the component tasks are performed contiguously, the task roster only facilitates the sequential performance of component tasks. Furthermore, while conventional UI mechanisms such as the drop-down menu provide no indication of the required sequence of specified tasks and their respective states, the task roster of the present invention provides visual assistance to end-users to ensure that the assist the performance of component tasks in the proper sequence.

Figure 1:
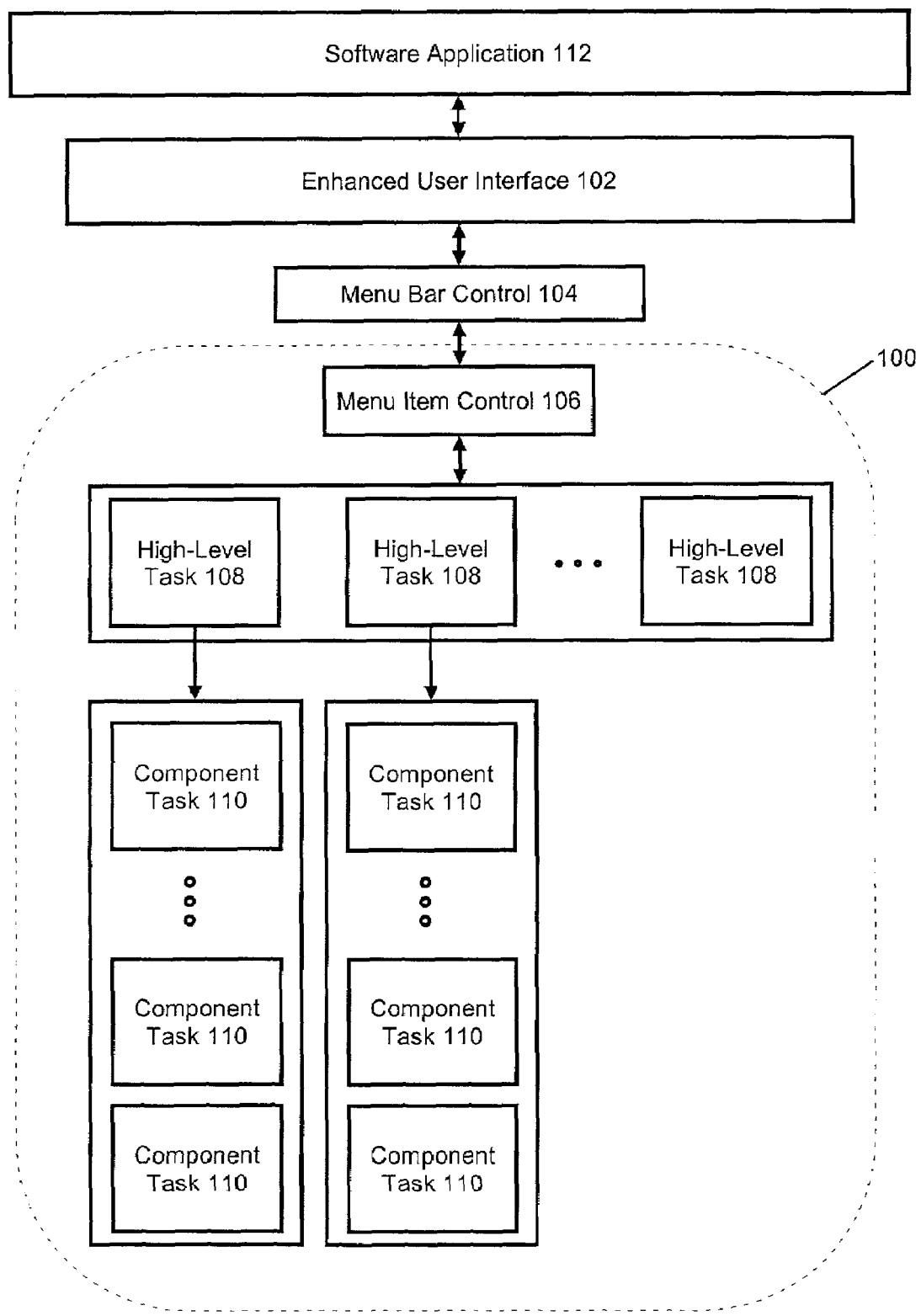
FIG. 1 is a block diagram illustrating an exemplary software architecture for the task roster of the present invention; and, FIG. 2 is a pictorial illustration of a UI configured with a task roster in accordance with the inventive arrangements.

FIG. 1 is a block diagram illustrating an exemplary software architecture for the task roster of the present invention. As shown in FIG. 1, a task roster 100 can be implemented in a software application 112 which can include an enhanced UI 102 through which users can interact with the software application 112. The enhanced UI 102, as is the case of a conventional UI, can include a menu bar control 104. The menu bar control 104, in turn, can include a multiplicity of menu item controls 106. Notably, in one aspect of the present invention, the task roster 100 can be included as part of the software application as a menu item control 106. Notwithstanding, the invention is not limited in this regard and the task roster 100 can be implemented in other UI controls, for instance in a toolbar, or even within a secondary, detachable window.

One particular menu item control 106 in the menu bar control 104 can include a list of high-level tasks 108 which can be performed to achieve some result in the software application 100. Each high-level task 108 can include one or more component tasks 110. In the present invention, it is assumed that one or more of the high-level tasks 108 include a plurality of corresponding component tasks 110 which must be performed in a predefined sequence in order to achieve complete the corresponding high-level task 108.

In operation, each time a user selects a particular high-level task 108 from the menu item control 106, the task roster 100 can load a list of component tasks 110 from memory. The pre-specified sequence for performing the component tasks 110 can be determined and the list can be presented in that order. Additionally, the stored state of each component task 110 in the list can be displayed. Notably, though not illustrated in FIG. 1, the state of each high-level task 108 in the menu item control 106 also can be displayed to show when all of the component tasks 110 in a high-level task 108 have been completed.

Unlike task wizards and other such UI mechanisms, the task roster 100 can permit the non-contiguous performance of component tasks 110 in a high-level task 108. To facilitate the completion of the component tasks 110 in proper sequence, however, visual cues can be provided to end-users to indicate whether particular component tasks 110 have been completed and whether any component tasks 110 have been skipped. The visual cues can vary according to the stored state of each component task 110.

Notably, although the task roster 100 of FIG. 1 is shown having a menu item control implementation, the invention is not so limited. Rather, the scope of the invention extends beyond the limitations of UI control types. In fact, the task roster of the present invention can be implemented using any UI mechanism, such as a pop-up window or dialog box, through which component tasks can be presented in addition to their respective states, and through which an end-user can select each such component task for execution. Still, for ease of illustration, the task roster is illustrated in one preferred aspect of the invention in which a menu item control is used as the implementing UI mechanism.

Figure 2:
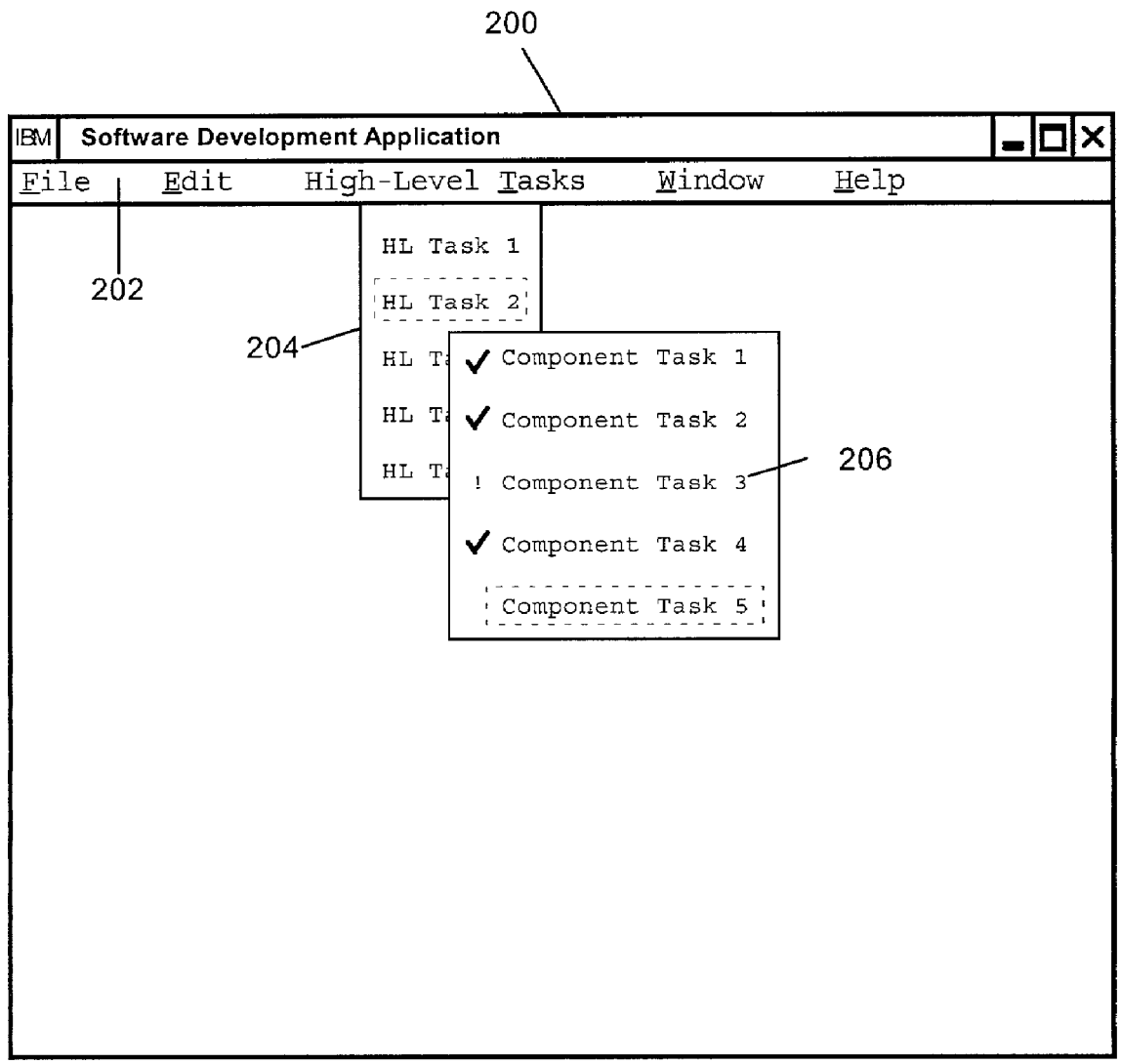

FIG. 2 is a pictorial illustration of a software application which has been configured with a task roster implemented in accordance with the menu control item aspect of the present invention. As shown in FIG. 2, a software application 200 such as a software development application can include a UI which, among its UI visual controls, can include a menu bar 202. As in the case of conventional menu bars, the menu bar 202 of FIG. 2 further can include menu items including a high-level task menu item. Selecting the high-level task menu item can result in the software application 200 displaying a sub-menu in the form of a list of selectable sub-menu items 204. The list of selectable sub-menu items 204 can include a list of high-level tasks which can be performed by an end-user. Specifically, an end-user's selection of any of the high-level tasks can invoke a task roster 206.

The task roster 206 of the present invention both can present and initiate selected component tasks corresponding to a particular high-level task. Moreover, the task roster 206 can include in its presentation of component tasks, the prescribed order of the component tasks and their completion status. Also, through the task roster 206, end-users can initiate performance of selected ones of the component tasks. Still, in contrast to the task wizards of the prior art, the task roster 206 optionally, but not necessarily, can reinforce a prescribed execution sequence associated with the component tasks corresponding to a selected high-level task.

Notably, unlike task wizards of the prior art, the task roster 206 of the present invention can indicate the completion status of individual component tasks. That is, the task roster 206 can indicate which of those component tasks have been completed (and, hence, are in a valid state), which have yet to be completed, and which have been skipped. As shown in FIG. 2, for illustrative purposes only, a check mark next to a component task can act as a visual cue to an end-user that the component task has been completed in its prescribed sequence. By comparison, an exclamation point placed next to a component task can act as a visual cue to an end-user that the component task either has not been completed in its prescribed sequence, or that it has been completed out of sequence.

Finally, the task roster 206 of the present invention can initiate execution of a selected component task responsive to an end-user's selection of the same. Specifically, responsive to an end-user's selection of a particular component task, the task roster 206 can cause the software application 200 to launch a UI for facilitating the completion of the selected component task. In particular, the UI can be a secondary dialog box, a file editor, etc. Importantly, the task roster 206 is not configured to ensure the completion of the component tasks in a pre-specified order. Rather, the task roster 206 is configured only to visually cue the end-user that one or more intervening tasks have not yet been completed. In any case, advantageously, the task roster of the present invention can present component tasks and their respective status associated with a high-level task in a single UI control.

A task roster which has been configured in accordance with the inventive arrangements can be realized as a computer program or computer program component, both in a centralized fashion in one computer system, and also in a distributed fashion where different elements are spread across several interconnected computer systems. Any kind of computer system, or other apparatus adapted for carrying out the methods described herein, is suited.

Computer program or application in the present context means any expression, in any language, code or notation, of a set of instructions intended to cause a system having an information processing capability to perform a particular function either directly or after either or both of the following a) conversion to another language, code or notation; b)

reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A method for achieving a higher-order task comprising the steps of:
    Providing a listing of higher-order tasks, each said higher-order task comprising a plurality of sequential lower-order tasks;
    Listing sequential lower-order tasks as a list in a user interface (UI) control, said sequential lower-order tasks collectively forming the higher-order task;
    Retrieving a specified sequence in which said sequential lower-order tasks are to be performed in order to achieve the higher-order task;
    Initiating selected sequential lower-order tasks in said list in said UI control, regardless of said specified sequence;
    Visually indicating whether each of said sequential lower-order tasks in said list have been performed in said specified sequence;
    Performing said listing, retrieving, initiating, and visually indicating steps for selected ones of said higher-order tasks; and
    Wherein said higher-order tasks are software development tasks to be performed in a software development application.

2. The method of claim 1, further comprising the step of:
    Visually indicating whether each of said sequential lower-order tasks in said list has not been performed in said specified sequence.

3. The method of claim 1, further comprising the step of:
    Visually indicating whether each of said sequential lower-order tasks in said list has been performed out of said specified sequence.

4. A machine readable storage having stored thereon a computer program for achieving a higher-order task, said computer program comprising a routine set of instructions for causing the computer to perform the steps of:
    Providing a list of higher-order tasks, each said higher-order task comprising a plurality of sequential lower-order tasks;
    Listing sequential lower-order tasks as a list in a user interface (UI) control, said sequential lower-order tasks collectively forming the higher-order task;
    Retrieving a specified sequence in which said sequential lower-order tasks are to be performed in order to achieve the higher-order task;
    Initiating selected sequential lower-order tasks in said list in said UI control, regardless of said specified sequence;
    Visually indicating whether each of said sequential lower-order tasks in said list have been performed in said specified sequence;
    Performing said listing, retrieving, initiating, and visually indicating steps for selected ones of said higher-order tasks; and
    Wherein said higher-order tasks are software development tasks to be performed in a software development application.

5. The machine readable storage of claim 4, further comprising the step of:
    Visually indicating whether each of said sequential lower-order tasks in said list has not been performed in said specified sequence.

6. The machine readable storage of claim 4, further comprising the step of:
    Visually indicating whether each of said sequential lower-order tasks in said list has been performed out of said specified sequence.

* * * * *